(12) United States Patent
Geissenhainer

(10) Patent No.: X7875
(45) Date of Patent: Dec. 19, 1833

(54) IRON & STEEL, BY ANTHRACITE COAL

(76) Inventor: F.W. Geissenhainer

F. W. Geissenhainer

The Schedule referred to in these Letters Patent, and making part of the same, containing a description in the words of the said F. W. Geissenhainer himself of his improvement in the manufacture of Iron & Steel by the application of Anthracite coal

---

To all to whom these Presents shall come

Be it Known that I. F. W. Geissenhainer of the City of Newyork in the State of Newyork have invented or discovered a new and useful improvement in the manufacture of Iron & Steel by the application of Anthracite coal in smelting iron ore into pigs or cast iron in carbonating and refining Iron ore into malleable iron and in combining iron in a metallic state with a greater quantity of carbon, if bar iron, for steel, if white pig or cast iron, for a superior quality A correct account of which, drawn and signed by me, in the presence of a witness and attested by the signature of his name on the thirty first of August in the year of our Lord One thousand Eight Hundred and Thirty One, was deposited and filed in the Patent Office on the fifth day of September in the same year One thousand Eight Hundred and thirty one – And that the following is a full and exact description of my said invention discovery or improvement, viz:

I discovered first that Iron ore, raw or roasted can and may be deoxydated & carbonated, and that so likewise, iron in a metallic state can and may be combined with a greater quantity of carbon than it possesses, by the sole use or application of anthracite coal fully as well and as perfect as by the use or applicati[on] of charcoal of wood –

For this purpose, the iron ore or the iron in a metallic state as the case may be; is mixed or stratefied with dust or small pieces of Anthracite coal in a converting furnace similar to those used in converting bar iron into steel, or in a furnace of another construction, or in any other fit vessel. The furnace or the muffle is then carefully covered or closed, in order
to protect and secure the said materials therein contained from
all access of atmospheric air, and is exposed for a sufficient length
of time to such a degree of heat, which may be produced also by the
use of Anthracite coal as fuel, as is necessary to effect the union
of the iron in the ore or of the iron in a metallic state as aforesaid
as the case may be, with a sufficient proper or required quantity of
carbon or coaly matter from the dust or small pieces of Anthracite
coal applied. Iron ore, so deoxidated & carbonated can and may after-
wards be smelted into pig or cast iron, the necessary flux being given, if
the ore be not of such a nature as to require no flux – The smelting
may be performed either in crucibles or in an air furnace, or in any
kind of blast furnace with a blast appropriate to the Anthracite
coal used as fuel.

Iron ore so deoxidated & carbonated can and may also be
refined and converted into malleable iron, by subjecting it to such
a process as is common in refining pig iron into malleable or bar
iron, for which purpose anthracite coal may be also used as fuel By combining with carbon, from the dust or small pieces of
of anthracite coal as aforesaid, bar iron is usefully converted into
steel, & white pig or cast iron of an inferior quality into a quality
greatly superior – By this discovery now described of a perfect
deoxidation and carbonation of raw or roasted iron ore by the sole
use or application of anthracite coal I became convinced, that
pure anthracite is pure carbon in a very compact or dense state
mixed with a small portion of earths and sometimes also with
a small portion of oxide of iron, and knowing its great continuity
by which I mean not its cohesion when cold or in a low temperature
but its aptness to run together in a moderately high temperature
which can be overcome only by a greatly higher temperature, I was
led to the further discovery of the whole mystery in the only true prin-
ciple and manner heretofore unknown, to smelt or reduce iron ore
into pig or cast iron of the best quality by the use or application of anthracite coal exclusively as fuel, the iron ore being put or filled into the furnace raw or roasted as its particular nature will admit or require without being previously prepared by a separate proceſs of deoxidation and carbonation as afore described; and I do hereby declare that the mystery or only true principle and manner, the great desideratum heretofore unknown, discovered by me to make the heat and the carbon of the Anthracite coal operate upon the iron ore and to smelt it, consists in applying in an appropriate blast furnace a blast or a column, or stream or current of air in or of such a quantity, velocity & density or compreſsion as the compactneſs or density and the continuity of the Anthracite coal used, requires, that is to say, in a quantity, velocity & density or compreſsion greater than is or would be required for charcoal of wood or for coke of bituminous coal, and indeed as much, and in such a proportion, greater as the anthracite coal exceeds either the charcoal of wood, or coke of bituminous coal in compactneſs or density and in continuity.—

In order to illustrate this principle, let it be supposed that the compactneſs or density and the continuity of the best charcoal of wood, be to the compactneſs or density and the continuity of the best coke of bituminous coal in proportion as one to two and a half, and let it be supposed, that the compactneſs or density & the continuity of the best coke of bituminous coal, be to the compactneſs or density & the continuity of the best Anthracite coal in proportion as two & a half to three and a half, then and in that supposed case the quantity, velocity and density or compreſsion of a blast neceſsary & proper for such anthracite coal should be in proportion to the quantity, velocity and density or compreſsion of a blast neceſsary and proper for such charcoal of wood, as three and a half to one and in proportion to the quantity, velocity and density or compreſsion of a blast neceſsary and proper for such coke of bituminous coal as three and a half, to two and a half.—

By this illustration, the true principle and manner of smelting iron ore with anthracite coal, is fully explained as con-

[illegible] as aforesaid, in applying or introducing into a blast furnace
a blast in [illegible] of such a quantity of velocity and density or compression
as the compactness or density and the continuity of the Anthracite
coal used, requires —

The blast may be of common atmospheric or of heated
air; in either case the principle stated, remains unalterably the same
Heated air, I should prefer in an economical point of view —

In order not to be misunderstood, I observe again, that by the
term, continuity, applying this term here to coal used in blast fur-
naces, I do understand and mean, not the cohesion of its particles
out of the fire or in a low temperature, but its tendency or aptness
to run and hold together or cohere in a certain high, but yet moderate-
ly high temperature, which is counteracted and overcome by increas-
ing the temperature to a sufficiently higher degree —

That the construction of a blast furnace for the use of Anthra-
cite coal ought in width and height be proportioned accordingly,
is reasonable as a blast furnace for smelting iron ore with, ^coke of^ bitu-
minous coal ought to be proportionably higher than is absolutely
required for a blast furnace smelting iron ore with charcoal of
wood their respective widths being equal to a blast furnace for
smelting iron ore with anthracite coal exclusively as fuel ought
to a certain limit which future experience will best point out, be
proportionably higher than a blast furnace for smelting iron
ore with coke of bituminous coal as fuel, their respective widths
being equal —

I would remark that the use of anthracite coal does not
supersede the necessity or usefulness of applying an appropriate
flux, where the nature of the Iron ore used, requires a flux, on the
contrary, the small portion of earths met with, in even the most
pure kind of Anthracite coal requires a proportionate addition
of limestone over and above the quantity required by the particular
nature of the iron ore used —

What I claim as my discovery, is the following Viz:

First, the application of anthracite coal exclusively or in part, in
deoxidating ~~and~~ carbonating iron ore as above specified & described
Secondly, the application of anthracite coal exclusively or in part
in combining iron in a metallic state with a greater quantity of
carbon, if bar iron for steel, if pig or cast iron, for a superior qual-
-ity as above specified and described.
Thirdly, the smelting or reducing of iron ore so deoxidated and
carbonated by the application of Anthracite coal as aforesaid, into
pig or cast iron.

Fourthly, the refining or converting of iron ore so deoxidated
and carbonated by the application of Anthracite coal as aforesaid
into malleable or bar iron.

Fifthly the application of anthracite coal as fuel in smelting
or reducing iron ore raw or roasted, but not prepared by a previous
separate proceſs of deoxidation and carbonation as above described
into pig or cast iron.

Blast furnaces upon the principle and in the manner
above stated by applying a blast in or of such a quantity, velocity
and density or under such a preſsure as the compactneſs or density
and the continuity of the [illegible] coal used, requires exceeding
the quantity, velocity and density or compreſsion not only of a
blast, neceſsary and proper in the use of charcoal of wood as
fuel, ~~in such proportion~~ but also of a blast neceſsary and proper
in the use of coke of bituminous coal as fuel, in such proportion
as the compactneſs or density and continuity of the anthracite
coal exceeds the compactneſs or density and the continuity of either
charcoal of wood, or coke of bituminous coal, as above amply
and fully described and illustrated.

Sixthly – Tho' I cannot and do not claim an exclusive right
of the use of heated air for any kind of fuel nevertheless I conceive
I have a right to claim and do claim the use of heated air,
applied upon and in connection with the said principle and
manner discovered by me to smelt iron ore in blast furnaces with anthracite coal by applying a blast of air in such a quantity velocity and density or under such pressure, as the compactness or density and the continuity of the anthracite coal requires, as above amply and fully described and illustrated.

Dated at the city of Newyork on the twenty first day of November, One thousand Eight Hundred and Thirty Three Witnesses sig.d Friederich W. Geissenhainer Pierpont Potter H. K. Western

[illegible]

[1820 [illegible]]